United States Patent
Baker et al.

(10) Patent No.: US 7,090,145 B2
(45) Date of Patent: Aug. 15, 2006

(54) LIQUID COOLED FUEL INJECTION VALVE AND METHOD OF OPERATING A LIQUID COOLED FUEL INJECTION VALVE

(75) Inventors: S. Michael Baker, Victoria (CA); Victor J. Perr, Greenwood, IN (US); P. Douglas Free, Columbus, IN (US)

(73) Assignee: Westport Research Inc., Vancouver (CA)

( * ) Notice: Subject to any disclaimer, the term of this patent is extended or adjusted under 35 U.S.C. 154(b) by 0 days.

(21) Appl. No.: 11/090,462

(22) Filed: Mar. 25, 2005

(65) Prior Publication Data

US 2005/0224601 A1    Oct. 13, 2005

Related U.S. Application Data

(63) Continuation of application No. PCT/CA2003/001493, filed on Sep. 26, 2003.

(30) Foreign Application Priority Data

Sep. 26, 2002  (CA)  .................................. 2405350

(51) Int. Cl.
  *F02M 53/04*  (2006.01)
(52) U.S. Cl. .................. 239/132.5; 123/299; 123/304; 239/533.9
(58) Field of Classification Search ............... 123/299, 123/446, 457, 304; 239/132.3, 132.5, 533.9
See application file for complete search history.

(56) References Cited

U.S. PATENT DOCUMENTS

| 3,486,494 | A | * | 12/1969 | Dreisin | ....................... 123/457 |
| 3,737,100 | A | * | 6/1973 | Dreisin | ..................... 239/132.5 |
| 3,945,353 | A | | 3/1976 | Dreisin | |
| 4,261,513 | A | * | 4/1981 | Andrews | ................... 239/533.8 |
| 4,420,116 | A | | 12/1983 | Warlick | |
| 5,373,449 | A | * | 12/1994 | Baker | ........................ 700/162 |
| 5,740,782 | A | | 4/1998 | Lowi, Jr. | |
| 5,765,755 | A | | 6/1998 | Peters et al. | |
| 5,769,319 | A | | 6/1998 | Yen et al. | |
| 6,024,297 | A | * | 2/2000 | Greeves | ..................... 239/533.9 |
| 6,612,518 | B1 | | 9/2003 | Nordlof | |

FOREIGN PATENT DOCUMENTS

| DE | 3928912 A1 | 4/1990 |
| DE | 19639149 C1 | 2/1998 |
| DE | 19847388 A1 | 4/2000 |
| EP | 0845592 | 6/1998 |
| GB | 665325 | 1/1952 |
| GB | 2030219 | 4/1980 |
| JP | 08-200183 | 8/1996 |
| KR | 8700257 | 2/1987 |

* cited by examiner

*Primary Examiner*—T. M. Argenbright
(74) *Attorney, Agent, or Firm*—McAndrews, Held & Malloy, Ltd.

(57) ABSTRACT

A liquid cooled fuel injection valve is operable to inject fuel directly into a combustion chamber through a nozzle orifice provided in an injector tip. The fuel injection valve further comprises a cooling system for draining fuel from a fuel cavity disposed within the injector tip and a drain valve that opens when pressure within the fuel cavity is greater than a predetermined set point. Fuel drained through the cooling system is directed to a drain system that may be combined with drain passages typically found in fuel injection valves. In a preferred embodiment, the drain valve is disposed within the fuel injection valve.

46 Claims, 5 Drawing Sheets

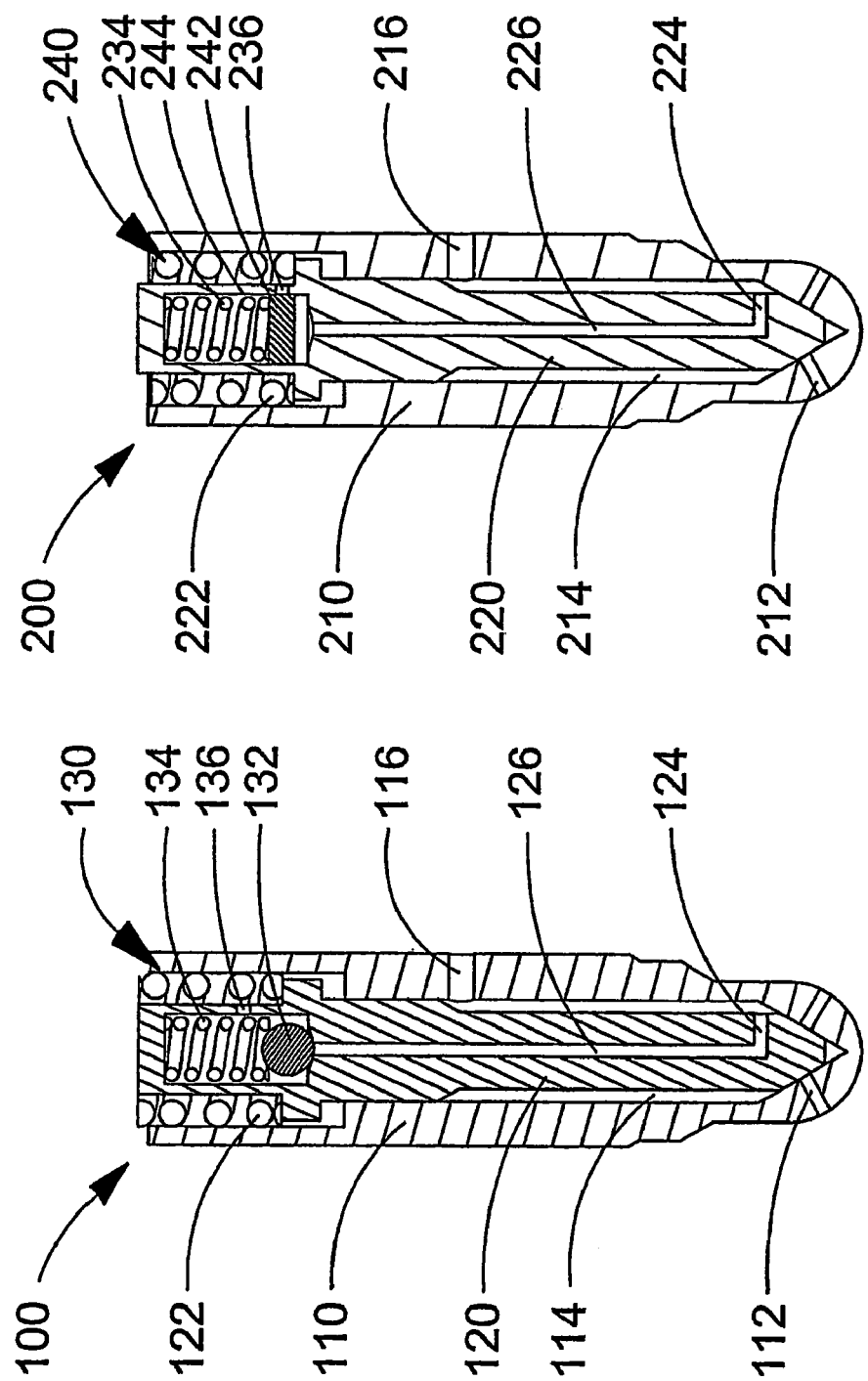

LIQUID COOLED FUEL INJECTION VALVE AND METHOD OF OPERATING A LIQUID COOLED FUEL INJECTION VALVE

CROSS-REFERENCE TO RELATED APPLICATION(S)

This application is a continuation of International Application No. PCT/CA2003/001493, having an international filing date of Sep. 26, 2003, entitled, "Liquid Cooled Fuel Injection Valve And Method Of Operating A Liquid Cooled Fuel Injection Valve". International Application No. PCT/CA2003/001493 claimed priority benefits, in turn, from Canadian Patent Application No. 2,405,350 filed Sep. 26, 2002. International Application No. PCT/CA2003/001493 is also hereby incorporated by reference herein in its entirety.

FIELD OF THE INVENTION

The present invention relates to a liquid cooled fuel injection valve and a method of operating a liquid cooled fuel injection valve. More particularly, the invention relates to an apparatus and method for using fuel as the cooling medium and controlling when cooling occurs.

BACKGROUND OF THE INVENTION

A fuel injection valve comprises a nozzle, also known as an injector tip, which is inserted into the combustion chamber of an internal combustion engine. During engine operation, this injector tip is exposed to high temperatures generated by combustion in the combustion chamber. It is not uncommon for flame temperature in the combustion chamber to exceed 4000 degrees Fahrenheit (about 2200 degrees Celsius), and in such situations the injector tip could be heated to service temperatures in excess of its tempering temperature.

For a fuel injection valve employed by a conventional diesel-fueled engine, the liquid diesel fuel serves as the cooling medium that cools the injector tip. That is, heat is transferred from the body of the injector tip to the liquid fuel that is present within the injector tip in the annular cavity around the valve needle, and the flow of liquid fuel through the injector tip and into the combustion chamber provides sufficient cooling for the body of the injector tip.

However, gaseous-fueled engines are being developed to substitute diesel fuel with cleaner burning gaseous fuels. A problem with gaseous fuels such as natural gas is that, compared to diesel fuel, much higher temperatures and pressures are needed for auto-ignition. A solution to this problem, which allows the major components of diesel engines to be preserved, injects a small amount of more auto-ignitable fuel such as conventional diesel fuel, to initiate the ignition of the gaseous fuel.

In addition, diesel fuel may be employed within the fuel injection valve to act as a lubricant and coolant. However, the quantity of pilot diesel fuel that is injected into the combustion chamber to trigger ignition of the gaseous fuel is much less than the quantity of diesel fuel that would be injected into the combustion chamber in a conventional diesel-fueled engine. During engine operation, the quantity of pilot diesel fuel may be less than 5% of the total fuel consumed (measured on an energy basis). When the diesel fuel consumption is this low, the cooling provided by the flow of liquid diesel fuel through the fuel injection valve may not be sufficient to cool the injector tip when peak combustion chamber temperatures are reached. If the injector tip overheats, possible consequences include, heat deformation of the injector tip body and fuel "coking", a condition created by fuel being exposed to reducing conditions.

Some fuel injection valves have been proposed that divert some of the liquid fuel from the nozzle tip back to drain, thereby increasing the flow of liquid diesel fuel through the fuel injection valve to help with cooling.

For example, published German patent application DE 3928912 A1 discloses a fuel injection valve that uses fuel to cool the nozzle body by draining fuel through a drain passage that is opened when the fuel injection valve is opened by lifting the valve needle from the valve seat. With such arrangements, fuel is only returned to drain when the fuel injection valve is open, so the cooling effect of the fuel flow is only realized during the brief duration of an injection event. In addition, fuel is sent to drain whenever the fuel injection valve is open, including times when extra cooling is not necessary, such as times during start up or when the engine is idling. It is especially desirable to reduce parasitic loads during start up, when power needs may be supplied by a battery. Accordingly, a problem with this arrangement is that it can result in significant parasitic loads during start-up and idling conditions. Also, because the timing for draining fuel is indiscriminant, in that an amount of fuel is drained with every injection event, this arrangement may require a larger fuel pump than would otherwise be required.

U.S. Pat. No. 3,737,100 discloses an internally cooled unit injector that intermittently drains fuel when fuel is not being injected into a combustion chamber. The times when fuel is drained from the unit injector is controlled by the position of lands and grooved features of the plunger that respectively cover and open drain passages. With this arrangement, fuel is drained in each cycle regardless of whether the engine is starting up or already running, again resulting in significant parasitic loads at times when it is desirable to reduce parasitic loading. More importantly, during start up, the fuel pump operates at a lower speed, compared to normal operation, and increasing fuel flowrate during start up may require a larger pump, which is not necessary during normal operation, when the pump typically operates at a faster speed.

Published German patent application DE 198 47 388 A1, (the '388 Application), discloses a fuel injection system that is operable to drain a portion of the fuel from the nozzle fuel cavity. The '388 application teaches cooling the fuel injection valve during engine braking or at crankshaft angles when fuel is not being injected into the engine's combustion chamber. The fuel flow to drain is regulated dependent upon an operational parameter of the engine, such as engine RPM and/or the loading pressure generated by an exhaust turbo charger. A simple shut off valve and a variable throttle are disposed in a drain line outside of the fuel injection valve to regulate flow of fuel from the fuel injection valve through the drain line. A problem with this arrangement is the complexity of the drain valve and throttle arrangement, which adds a high pressure drain system downstream from the fuel injection valve, with joints connecting the high pressure drain line to the fuel injection valve body, the drain valve, and the throttle.

U.S. Pat. No. 5,740,782 discloses many different arrangements for cooling a fuel injection valve, including using fuel as the coolant. In one such arrangement cooling fluid passages disposed within the body of the injector tip act as a cooling jacket. The cooling fluid passages are in permanent fluid communication with the fuel supply rail for continuously draining fuel from the fuel supply system.

As noted with respect to the references already presented, continuously draining pilot fuel from the fuel supply system or the nozzle cavity increases the parasitic load on the fuel supply system and could require a larger fuel supply pump. Accordingly, there is a need to provide cooling to the injector tip, while enabling engine start up without oversizing other engine components much beyond what is required for normal operation.

SUMMARY OF THE INVENTION

A liquid cooled fuel injection valve comprises:
(a) an injection valve body that comprises a longitudinal axis with an injector tip comprising at least one nozzle orifice associated with one end of the longitudinal axis, wherein the injector tip is installable at a location in an engine where a liquid fuel can be injected directly into a combustion chamber through the at least one nozzle orifice;
(b) a fuel cavity disposed within the injection valve body near the injector tip;
(c) a valve member disposed within the injection valve body, wherein the valve member is movable parallel to the longitudinal axis between a closed position where the valve member contacts a valve seat, and an open position where the valve member is spaced apart from the valve seat, whereby the liquid fuel may flow from the fuel cavity, between the valve member and the valve seat, and into the combustion chamber through the at least one nozzle orifice;
(d) a fuel supply passage disposed within the injection valve body and communicating between a fuel inlet port and the fuel cavity;
(e) a drain passage communicating between the fuel cavity and a drain system for returning the liquid fuel to a fuel supply system; and
(f) a drain valve associated with the drain passage and disposed within the injection valve body, wherein the drain valve is closeable to stop fuel from flowing through the drain passage and wherein the drain valve is operable independently from actuation of the valve member.

The drain valve is preferably spring biased so that it does not open unless fuel pressure within the fuel cavity is greater than a predetermined set point. By controlling fuel pressure within a range of pressures, the drain valve is operable independently from actuation of the valve member. For example, when the fuel pressure within the fuel cavity is less than the predetermined set point, the drain valve remains closed while fuel is injected into the combustion chamber during an injection event. As long as the pressure within the fuel cavity is higher than the predetermined set point, the drain valve can be open, even during a fuel injection event. The ability to control when cooling occurs, for example by controlling fuel pressure, allows cooling to be controlled independently of valve member movement and timing for fuel injection events, providing an advantage over prior art arrangements.

A "simple" spring biased drain valve does not comprise a controller or actuator. An advantage of a simple spring biased drain valve assembly is that it automatically closes when pressure is less than a predetermined set point, it is compact so that it can be disposed within the fuel injection valve, and it is inexpensive and durable.

In a first preferred embodiment, the drain passage comprises a bore within the valve member and a port opening between the fuel cavity and the bore. In the first preferred embodiment, the bore is a blind bore closed at the end of the valve member that cooperates with the valve seat within the injector tip. Such a bore may be made using electro-discharge machining or other known methods.

The drain valve of the first preferred embodiment can be disposed in a chamber within the valve member. The drain valve preferably comprises a spring-biased element that is movable from a seated position to allow the liquid fuel to flow through the bore when fuel pressure within the fuel cavity is greater than the predetermined set point. The spring-biased element, for example, may be a ball or needle member. In an alternative arrangement, the spring-biased member can be a shuttle member that is movable within a chamber disposed within the valve member. Such a shuttle member is movable against the bias of a drain valve spring to open a drain port when the pressure of the liquid fuel within the bore is greater than the predetermined set point. The distance that the shuttle member is displaced may be controlled to fully or partially reveal the drain port, whereby flow through the drain port can be modulated. Higher fuel pressure within the fuel cavity results in a greater displacement of the shuttle member and a higher fuel mass flow rate to the drain system.

In yet another arrangement, the drain valve comprises a spring clip comprising one end attached to the valve member and a free end covering a drain orifice. When fuel pressure within the fuel cavity is greater than a predetermined set point, fuel pressure lifts the free end of the spring clip away from the drain orifice and fuel exits the bore through the drain orifice and flows into the drain system by lifting the free end away from the drain orifice.

In a second preferred embodiment, the drain passage comprises a bore within the injection valve body and a port opening between the fuel cavity and the bore. The drain valve arrangements described with respect to the first preferred embodiment may also be employed with the second preferred embodiment, the main difference being the location of the drain passage and the drain valve being associated with the valve body instead of the valve member.

In both the first and second embodiments, the drain valve is preferably located within the fuel injection valve assembly. In the disclosed first embodiment the drain valve is associated with the valve member, and in the disclosed second embodiment, the drain valve is associated with the injection valve body. An advantage of locating the drain valve within the injection valve assembly is that it enables the low pressure drain collection system usually present within an injection valve to be combined with the present drain passage, downstream from the drain valve. A drain valve located outside of the injection valve assembly requires a separate high pressure drain line between the fuel injection valve and the external drain valve, which adds to capital and manufacturing costs, in addition to adding potential leakage and structural problems associated with joints and the high pressure drain line itself.

The drain valve is preferably a one-way valve through which fuel may only flow through the drain passage from the fuel cavity and into the drain system. In a preferred embodiment, the drain valve is openable by increasing amounts up to a predetermined maximum open position to allow more fuel to flow through the drain passage as pressure of the liquid fuel increases within the fuel cavity.

As already noted, an advantage of the disclosed drain valve is that it does not require a controller or actuator. The spring force that holds the drain valve closed is calibrated so that the drain valve opens whenever fuel pressure within the fuel cavity is greater than a predetermined pressure. For example, by controlling fuel pressure within the fuel cavity, the drain valve can be calibrated to open after engine start-up conditions are completed, during idling, and during shut down. If the fuel injection valve is a component of a combined fuel injection valve for independently and separately injecting gaseous fuel and liquid fuel into the combustion chamber, it may be desirable to prevent fuel from draining from the fuel cavity during shut down, to prevent high-pressure gaseous fuel from entering the liquid fuel cavity.

The present liquid cooled fuel injection valve may also be employed in a combined fuel injection valve for independently and separately injecting a liquid fuel into a combustion chamber through two different sets of nozzle orifices. Such an arrangement may be desirable when it is important to be able to accurately control the quantity of injected fuel over a broad range, and a conventional fuel injection valve capable of injecting larger quantities of fuel within that range, is not suitable for injecting smaller quantities of fuel within that range.

When the liquid cooled fuel injection valve is part of a combined fuel injection valve, a preferred arrangement employs a liquid cooled fuel injection valve body that is movable within a body of the combined fuel injection valve, whereby the liquid cooled fuel injection valve body serves as a movable needle for an outer fuel injection valve.

The present liquid cooled fuel injection valve may be applied to fuel injection valves of all types, including so-called unit injectors, but a preferred type is a common rail injector. In a unit injector, a piston assembly associated with the fuel injection valve assembly is employed to raise the fuel to injection pressure. Accordingly, fuel pressure within a unit injector is only elevated to high pressures during an injection event, and depending upon the predetermined set point for opening the drain valve, cooling in a unit injector may only be occur during an injection event when fuel pressure within the fuel cavity elevated.

In a common rail injector, the fuel pressure is increased to injection pressure by a fuel pump and the fuel is delivered at injection pressure to the fuel injection valve's fuel supply passage from a high-pressure common rail fuel supply system. A common rail arrangement simplifies the control of the drain valve, because fuel pressure in the common rail fuel supply system can be easily controlled to govern fuel pressure within the fuel cavities of the fuel injection valves.

The predetermined set point for opening the drain valve is chosen to be between two different fuel pressures in an operating band of the fuel supply system. For example, the operating band of the fuel supply system can be between 15 MPa and 30 MPa, which allows a broad range for choosing a predetermined set point. In addition the operation of the fuel injection valve is preferably controllable to adjust for changes in pressure within the fuel cavity between the first and second pressures so that the desired amount of fuel is injected into the combustion chamber. For example, one of the factors considered by the engine controller in setting the duration and timing of an injection event might include consideration of fuel pressure within the fuel cavity.

In a preferred embodiment, fuel pressure within the fuel cavity is controllable between a first pressure that is lower than the predetermined set point and a second pressure that is higher than the predetermined set point, so that during engine operation, under a first set of predetermined operating conditions, pressure within the fuel cavity is maintained between the first pressure and the predetermined set point to prevent flow through the drain valve, and under a second set of operating conditions, pressure within the fuel cavity is maintained between the predetermined set point and the second pressure to enable flow through the drain valve. The first set of predetermined operating conditions, for example, might include, start up, idling, and shut down conditions.

The drain valve may be operable to regulate the flow rate of fuel from the fuel cavity to the drain system. For example, in some embodiments such as when the drain valve employs a shuttle member, as described herein, fuel pressure within the fuel cavity may be controllable between the predetermined set point and a higher pressure to control the amount of fuel flowing through the drain valve, whereby higher pressures within the fuel cavity cause higher mass flow rates through the drain valve.

The fuel injection valve may further comprise a spill port associated with the valve member communicating between the drain system and a space in communication with the fuel cavity when the valve member is in the open position. Such a spill port may be employed for controlling the rate at which fuel is introduced into the combustion chamber. For example, the space that the spill port is open to may be the sac volume of the fuel injection valve and there may be a second valve seat disposed between the sac volume and the nozzle orifice.

Another preferred embodiment of a liquid cooled fuel injection valve comprises:

(a) an injection valve body that comprises a longitudinal axis with an injector tip comprising a nozzle orifice associated with one end of the longitudinal axis, wherein the injector tip is installable at a location in an engine where a liquid fuel can be injected directly into a combustion chamber through the nozzle orifice;

(b) a fuel cavity disposed within the injection valve body near the injector tip;

(c) a valve member disposed within the injection valve body, wherein the valve member is movable parallel to the longitudinal axis between a closed position wherein the valve member contacts a valve seat, and an open position wherein the valve member is spaced apart from the valve seat, whereby fuel may flow out from the fuel cavity, between the valve member and the valve seat, and into the combustion chamber through the nozzle orifice;

(d) a fuel supply passage disposed within the injection valve body and communicating between a fuel inlet port and the fuel cavity;

(e) a drain passage communicating between the fuel cavity and a drain system for returning fuel to a fuel supply system; and (f) a drain valve associated with the drain passage, wherein the drain valve is biased to close and stop fuel from flowing through the drain passage when fuel pressure within the fuel cavity is less than a predetermined set point.

A preferred method is also provided for cooling an injector tip of a fuel injection valve that is exposed to the temperatures within a combustion chamber. This method comprises:

supplying a liquid fuel to a fuel cavity disposed within the injector tip;

draining a first portion of the liquid fuel from the fuel cavity and out of the fuel injection valve;

stopping the first portion of the liquid fuel from draining from the fuel cavity when pressure within the fuel cavity is less than a predetermined set point; and during engine operation, injecting a second portion of the liquid fuel from the fuel cavity into the combustion chamber.

The preferred method further comprises controlling fuel pressure within the fuel cavity during engine operation, wherein the fuel pressure is controlled to be between a first pressure that is lower than the predetermined set point and a second pressure that is higher than the predetermined set point.

The method may further comprise increasing the mass flowrate of the first portion of the liquid fuel by increasing pressure within the fuel cavity when fuel pressure within the fuel cavity is greater than the predetermined set point.

The preferred method further comprises keeping fuel pressure within the fuel cavity between the first pressure and the predetermined set point during one or more predetermined operating conditions, such as engine start up, engine shut down, and engine idling conditions. The method may further comprise keeping fuel pressure within the fuel cavity between the first pressure and the predetermined set point when engine load is less than a predetermined load. The method may also further comprise keeping fuel pressure within the fuel cavity between the predetermined set point and the second pressure when engine load is greater than a predetermined load or when an engine operating parameter is detected which correlates to when cooling of said injector tip is desirable.

In another preferred method the predetermined set point is calibrated so that the first portion of the liquid fuel is stopped from draining during start up conditions, for example, when the fuel pump is driven at a slower speed, compared to post start up fuel pump speed.

In a preferred method the first portion of the liquid fuel is automatically continuously drained when pressure within the fuel cavity is greater than the predetermined set point.

The preferred method further comprises supplying the liquid fuel to the fuel injection valve from a high-pressure common rail fuel supply system. In a common rail system fuel pressure within the fuel cavity in which the valve member is disposed can contribute to the opening forces, but valve actuation is actually governed by an actuator that acts on the valve member. The actuator can be any known type of actuator, but is commonly hydraulic, piezoelectric, electromagnetic, or magnetostrictive. Accordingly, fuel pressure within the common rail fuel supply system can be controlled, for example, by actuating a pressure regulating valve or controlling the speed of a fuel pump. The preferred method comprises controlling pressure within the common rail supply system in response to predetermined cooling requirements for the fuel injection valve based upon an engine operating condition. Controlling fuel pressure in the common rail supply system effectively controls fuel pressure within the fuel cavity of a fuel injection valve to thereby open or close the drain valve by manipulating fuel pressure to be above or below the predetermined set point, respectively.

The method may further comprise draining a third portion of the liquid fuel from the fuel injection valve during an injection event. This may be accomplished, for example by draining the third portion of the fuel through a spill port that is only open during an injection event.

A method of manufacturing a fuel injection valve is also provided. For an injection valve such as the one described herein, comprising an injection valve body with an injector tip comprising at least one nozzle orifice, a fuel cavity disposed within the injection valve body near the injector tip, a valve member disposed within the injection valve body, a fuel supply passage disposed within the injection valve body and communicating between a fuel inlet port and the fuel cavity, a drain passage communicating between the fuel cavity and a drain system for returning a portion of the liquid fuel to a fuel supply system wherein the drain passage comprises a bore provided within the valve member, and a drain valve associated with the drain passage and disposed within the injection valve body. The method of manufacturing comprises making the bore using electro-discharge machining.

BRIEF DESCRIPTION OF THE DRAWINGS

The drawings illustrate specific preferred embodiments of the invention, but should not be considered as restricting the spirit or scope of the invention in any way:

FIG. 1 illustrates a partial section view of the injector tip end of a fuel injection valve that comprises a drain passage from a fuel cavity located therein. A drain valve positioned within the valve body permits one-way flow from the fuel cavity when fuel pressure therein is great enough to overcome the spring that biases the valve in a closed position.

FIG. 2 illustrates a partial section view of another embodiment of a fuel injection valve that comprises a drain passage from the fuel cavity located in the injector tip. This embodiment is similar to the embodiment of FIG. 1 but with a different type of drain valve. The drain valve of this embodiment employs a spring biased shuttle member that permits fuel to flow from the fuel cavity when fuel pressure therein is great enough to overcome the spring that biases the shuttle member in a closed position where it covers a drain port.

FIG. 3B shows the spring clip member wrapped around the valve needle with the closed position shown.

DETAILED DESCRIPTION OF PREFERRED EMBODIMENTS(S)

Figure 3B:
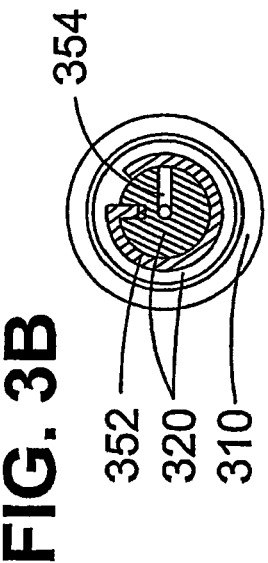
FIG. 3B is a section view through the valve needle at the section indicated in FIG. 3A.

A liquid cooled fuel injection valve is capable of using a portion of the liquid fuel contained within a fuel cavity provided within an injector tip to act as a liquid coolant for cooling the injector tip. A spring biased drain valve located within the body of the fuel injection valve or within the injection valve needle prevents fuel from flowing to drain when cooling is not required. The timing for cooling can be controlled by controlling fuel pressure within the fuel cavity whereby the drain valve is closed when fuel pressure is less than a predetermined set point. That is, the drain valve opens when fuel pressure within the fuel cavity is greater than the predetermined set point.

At start up, fuel pressure within the fuel cavity is initially low, so the drain valve can be calibrated to open after start up is over. In a preferred method, pressure within the fuel cavity is controlled so that the drain valve is shut during start up, when the engine is idling, during shut down, or whenever engine load is less than a predetermined load. When cooling is required, for example, when the engine load is more than a predetermined load, the drain valve may be opened by raising fuel pressure within the fuel cavity to a pressure above the set point.

Engines employing combined fuel injection valves for injecting both gaseous fuel and liquid fuel may employ fuel supply systems capable of regulating fuel pressure. In a common rail fuel supply system, fuel pressure may be controlled upstream from the fuel injection valve by controlling the fuel pump or by using a controllable pressure regulating valve. In these situations, the fuel pressure is variable and controllable by the system electronics, and can be selectively adjusted to either induce cooling flow or disable cooling flow.

The figures illustrate preferred embodiments of a liquid cooled fuel injection valve that may be used in accordance with the above-described method. With reference to the embodiment of FIG. 1, only the injector tip end of fuel injection valve 100 is shown. Fuel injection valve 100 comprises injection valve body 110, movable needle 120 and drain valve assembly 130. Injection valve body 110 has fuel nozzle orifices 112 through which fuel may be injected into a combustion chamber.

The fuel injection valve of FIG. 1 is shown in the closed position. That is, needle 120 is shown seated against a sealing surface of injection valve body 110. When needle 120 is seated it cooperates with injection valve body 110 to establish a boundary that prevents fuel from flowing from fuel cavity 114 to nozzle orifices 112. Needle 120 is biased in the closed position by needle spring 122. Conventional actuators may be employed to move needle 120 to an open position, wherein needle 120 is lifted away from the sealing surface of injection valve body 110. For example, using a typical hydraulic actuation arrangement (not shown), hydraulic pressure is employed in addition to needle spring 122 to hold needle 120 in the closed position. When the hydraulic pressure is relieved, fuel pressure within fuel cavity 114 overcomes the closing force of needle spring 122 and needle 120 moves to an open position and fuel is injected into a combustion chamber through nozzle orifices 112.

In the illustrated embodiment, fuel cavity 114 is defined as the annular space between needle 120 and the walls of a bore provided within injection valve body 110. Fuel is supplied to fuel cavity 114 through fuel inlet port 116. In this embodiment, fuel is supplied to inlet port 116 at injection pressure, from a high pressure common rail fuel supply system.

Fuel supplied to fuel cavity 114 also flows through port opening 124 into drain passage 126, which is a longitudinal bore provided inside needle 120.

When fuel pressure within fuel cavity 114 and drain passage 126 is greater than a predetermined set point, drain valve member 132 lifts away from its closed position (shown in FIG. 1). In the embodiment illustrated in FIG. 1, drain valve member 132 is in the shape of a ball. Those skilled in the art will understand that other shapes for the drain valve member may be employed without departing from the spirit of this disclosure. For example, another element, such as a needle, that is movable from a closed seated position to an open position, spaced apart from a valve seat, may be substituted instead of a ball. Drain valve spring 134 biases drain valve member 132 in the closed position. Accordingly, drain valve spring 134 is selected to provide the closing force necessary to hold drain valve member 132 in the closed position until the set point pressure is exceeded. When drain valve assembly 130 is open, a portion of the fuel supplied to fuel cavity 114 flows through drain passage 126 and drain port 136 and into a fuel drain system which returns fuel to the fuel supply system.

When an engine is starting up, before mechanical power from the engine is available to drive engine systems, electrical power is normally used to "crank" the engine and drive the engine systems necessary for engine start up, including the fuel pump. Crank speed during start up is typically much lower than crankshaft speed during normal operation, so a cooling system that allows fuel to flow to drain during start up requires a larger pump to provide higher fuel flow rates at low speed. However, it is undesirable to size the fuel pump based upon start up requirements because during normal operation, which represents the majority of engine operation, the fuel pump can be driven at higher speeds, and a fuel pump sized to provide higher flow rates for cooling during start up would be greatly oversized for normal operation. Another concern is conserving power during start up conditions. Reducing electrical power demands is especially important when electrical power is supplied from a battery, because if power demands are higher a larger battery is needed and the higher power demands may result in too much power being drained from the battery if the engine does not start immediately, causing damage to the battery and/or causing the engine to not start.

The set point for opening drain valve assembly 130 is chosen so that it is normally closed during start up conditions. During start up, fuel pressure within fuel cavity 114 is initially lower than the normal fuel pressure during post-start up conditions. By not draining fuel during start up, a smaller fuel pump may be employed, a parasitic load is eliminated, and fuel pressure within fuel cavity 114 can increase more rapidly, compared to a fuel injection valve that drains a portion of the fuel from its fuel cavity continuously.

Advantageously, compared to post-start up conditions, the temperature of the injector tip is normally lower during start up, so cooling of the injector tip is not critical.

After start up, mechanical power from the engine is available to drive engine systems, including the fuel pump, which is then typically driven at much higher speeds, and the parasitic load for draining a portion of the fuel from fuel cavity 114 is not significant. In addition, port opening 124 or drain passage 126 is preferably sized to provide a limit on the parasitic load by restricting the mass flow rate of fuel that is drained from fuel cavity 114 through drain passage 126.

In FIGS. 2 through 5, features that are substantially the same as the equivalent features of FIG. 1 are identified by reference numbers increased by increments of 100. If equivalent features function in substantially the same way, their function may not be described in detail again.

FIG. 2 illustrates another preferred embodiment of a liquid cooled fuel injection valve. Fuel injection valve 200 comprises injection valve body 210 (with only the injector tip portion shown in FIG. 2), movable needle 220 and drain valve assembly 240. Nozzle orifices 212 are provided near the end of the injector tip and needle spring 222 helps to bias needle 220 in the closed position. An annular space between injector valve body 210 and needle 220 defines fuel cavity 214. Fuel may be supplied to fuel cavity 214 through fuel inlet port 216, and drained from therefrom through port opening 224, drain passage 226, and drain port 236.

Drain valve assembly 240 controls the flow of fuel from fuel cavity 214 to drain. Compared to the embodiment of FIG. 1, the embodiment of FIG. 2 employs a different type of drain valve assembly. Drain valve assembly 240 is in substantially the same location as drain valve assembly 130 of FIG. 1, and drain valve spring 234 functions in substantially the same way as drain valve spring 134.

However, drain valve member 242 is a shuttle member that is movable in the direction of the longitudinal axis of fuel injection valve 200. To reduce leakage, the sides of drain valve member 242 that face valve chamber side wall 244 and side wall 244 are preferably a close fit. When drain valve assembly 240 is closed, valve member 242 covers drain port 236 to block fuel from flowing to drain. Drain valve assembly 240 is open when fuel pressure within fuel cavity 214 and drain passage 226 is sufficient to push drain valve member 242 against drain valve spring 234 so that it no longer blocks fuel from flowing through drain port 236.

Figure 3C:
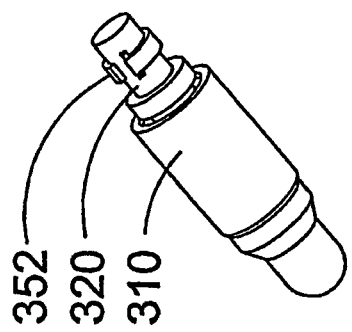
FIG. 3C illustrates a perspective view of a portion of a valve needle with a spring clip member and drain orifice.
Figure 3A:
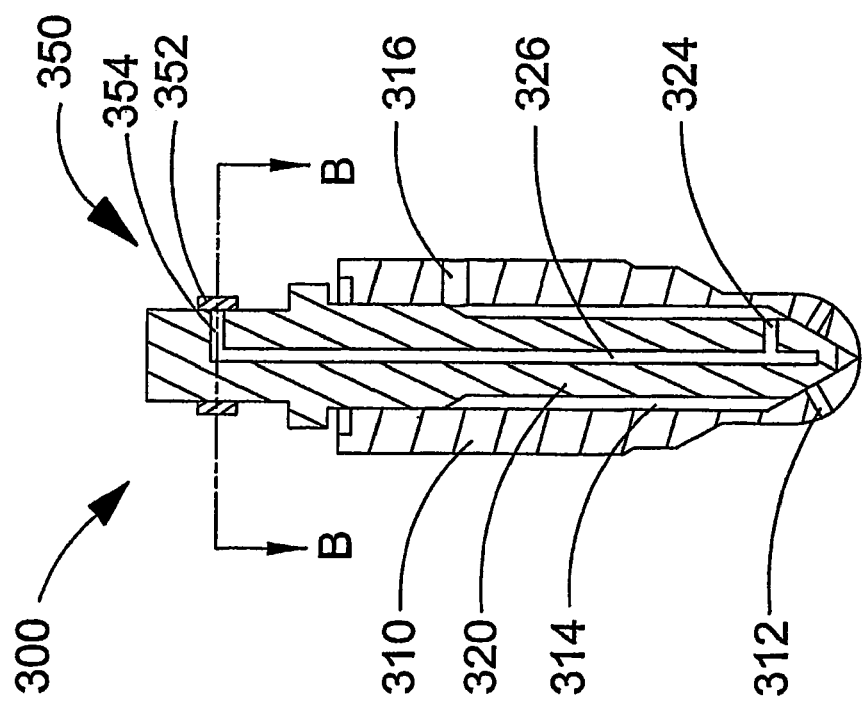
FIG. 3A illustrates a partial section view of another embodiment of a fuel injection valve that is like the embodiment of FIG. 1 except that the drain valve employs a spring clip member that covers a drain orifice when the fuel pressure within the fuel cavity is low. The spring clip member lifts away from the drain orifice opening when fuel pressure within the fuel cavity exceeds a predetermined set point.

FIGS. 3A, 3B and 3C illustrate yet another preferred embodiment of a liquid cooled fuel injection valve. Fuel injection valve 300 comprises injection valve body 310 (with only the injector tip portion shown in the Figures), movable needle 320 and drain valve assembly 350. Nozzle orifices 312 are provided near the end of the injector tip. An annular space between injector valve body 310 and needle 320 defines fuel cavity 314. Fuel may be supplied to fuel cavity 314 through fuel inlet port 316, and drained therefrom through port opening 324, drain passage 326.

Drain valve assembly 350 controls the flow of fuel from fuel cavity 314 to drain. In the embodiment of FIG. 3, drain valve assembly 350 comprises spring clip member 352 which is wrapped around needle 320, as best shown in the end section view of FIG. 3B and the perspective view of FIG. 3C. One end of spring clip member 352 is fixedly associated with needle 320, for example, by inserting an end into a groove provided in the surface of needle 320. The other end of spring clip member 352 is free, but is urged against needle 320 by the spring force of the spring clip member itself. However, when pressure within fuel cavity 314 is greater than a predetermined set point, the fuel pressure provides an opening force that lifts the free end of spring clip member 352 away from needle 320, so that fuel may flow through drain port 354 and into a drain system for returning the fuel to the fuel supply system.

Figure 4:
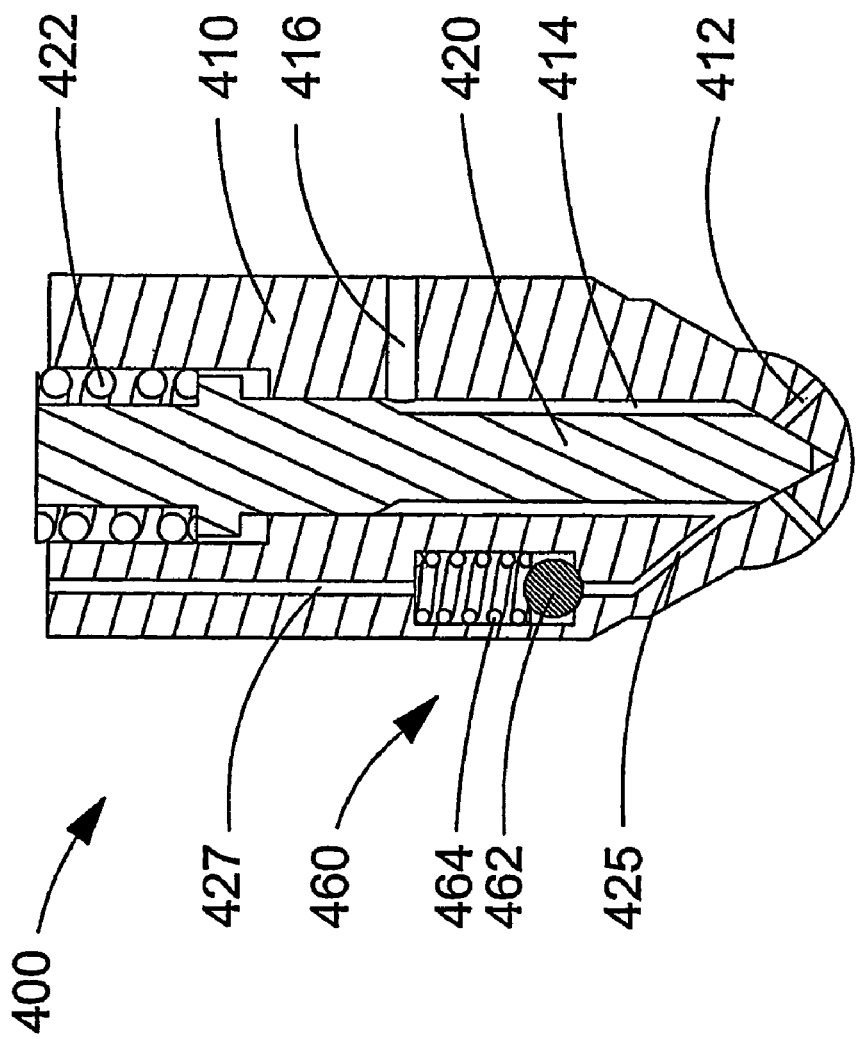
FIG. 4 illustrates a partial section view of another embodiment of a fuel injection valve that comprises a drain passage for draining fuel from the fuel cavity. In this embodiment, the drain passage and the drain valve are both disposed within the injection valve body.

FIG. 4 illustrates yet another preferred embodiment of a liquid cooled fuel injection valve. Fuel injection valve 400 comprises injection valve body 410 (with only the injector tip portion shown in FIG. 4), movable needle 420 and drain valve assembly 460. Nozzle orifices 412 are provided near the end of the injector tip and needle spring 422 helps to bias needle 420 in the closed position. An annular space between injector valve body 410 and needle 420 defines fuel cavity 414. Fuel may be supplied to fuel cavity 414 through fuel inlet port 416. A difference between the embodiment of FIG. 4 and the embodiments described above is that the drain passages and drain valve assembly are provided within injection valve body 410 instead of within needle 420.

When fuel pressure within fuel cavity 414 is greater than a predetermined set point, drain valve member 462 is lifted from its seated closed position against the bias of drain valve spring 464 and fuel is drained from fuel cavity 414 through drain passage 425, and drain port 427.

Figure 5:
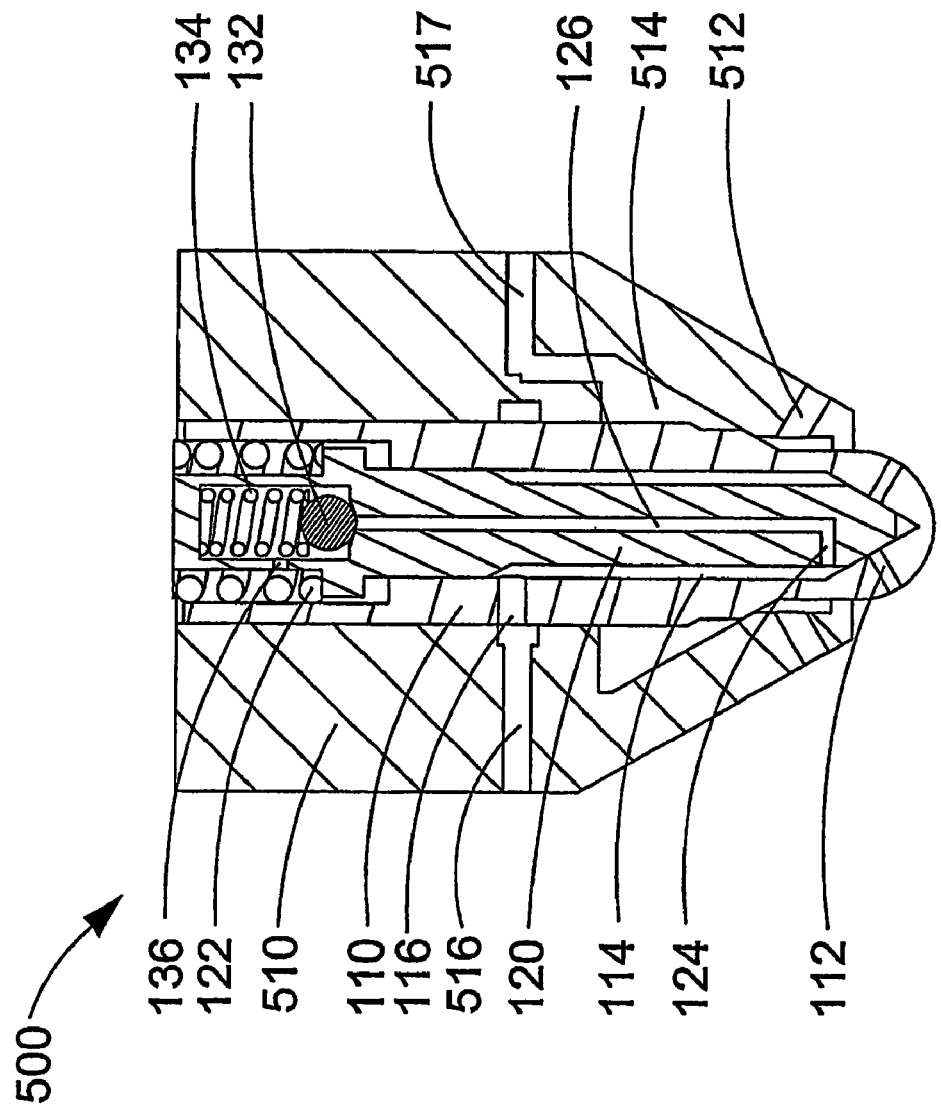
FIG. 5 illustrates a partial section view of an embodiment of the liquid cooled fuel injection valve, which is a component of a combined fuel injection valve for independently and separately injecting fuel into a combustion chamber through two different sets of nozzle orifices. The fuel injected through each set of nozzle orifices may be different fuels or the same fuel.

With reference to FIG. 5, combined valve assembly 500 comprises an inner valve assembly that is essentially the same as liquid cooled fuel injection valve 100. Like features are identified by like reference numbers. The main difference with the embodiment of FIG. 5 is that the liquid cooled fuel injection valve is a component of combined fuel injection valve assembly 500 that is employed for independently and separately injecting fuel directly into a combustion chamber through two sets of nozzle orifices. The fuel injected through each set of nozzle orifices may be different fuels or the same fuel. Inner fuel injection valve body 110 also serves as the movable needle member for an outer valve assembly.

In a preferred embodiment, the inner liquid cooled fuel injection valve is employed to inject a small quantity of pilot fuel, while the outer valve assembly is employed to inject a gaseous fuel which may represent more than 95% of the fuel supplied to the engine on an energy basis.

Gaseous fuel injection valve further comprises outer body 510 and sealing surfaces thereon for cooperating with features of inner fuel injection valve body 110, to close the gaseous fuel injection valve. Gaseous fuel nozzle orifices 512 provide a means for injecting the gaseous fuel into the combustion chamber from gaseous fuel cavity 514 when inner fuel injection valve body 110 is lifted away from the sealing surfaces of outer body 510.

During operation, liquid fuel is supplied to liquid fuel inlet port 116 through liquid fuel supply conduit 516, and gaseous fuel is supplied to gaseous fuel cavity 514 through gaseous fuel supply conduit 517.

The embodiment of FIG. 5 may also be employed to inject the same fuel through both sets of nozzle orifices. This arrangement can be utilized to provide accurate fuel metering over a broader range of fueling levels. For example, the inner liquid cooled fuel injection valve may be used when it is desirable to have improved control over fuel metering at idling or low loads, when smaller quantities of fuel are needed, and the outer valve assembly may be used at higher loads when larger quantities of fuel are needed.

Figure 6:
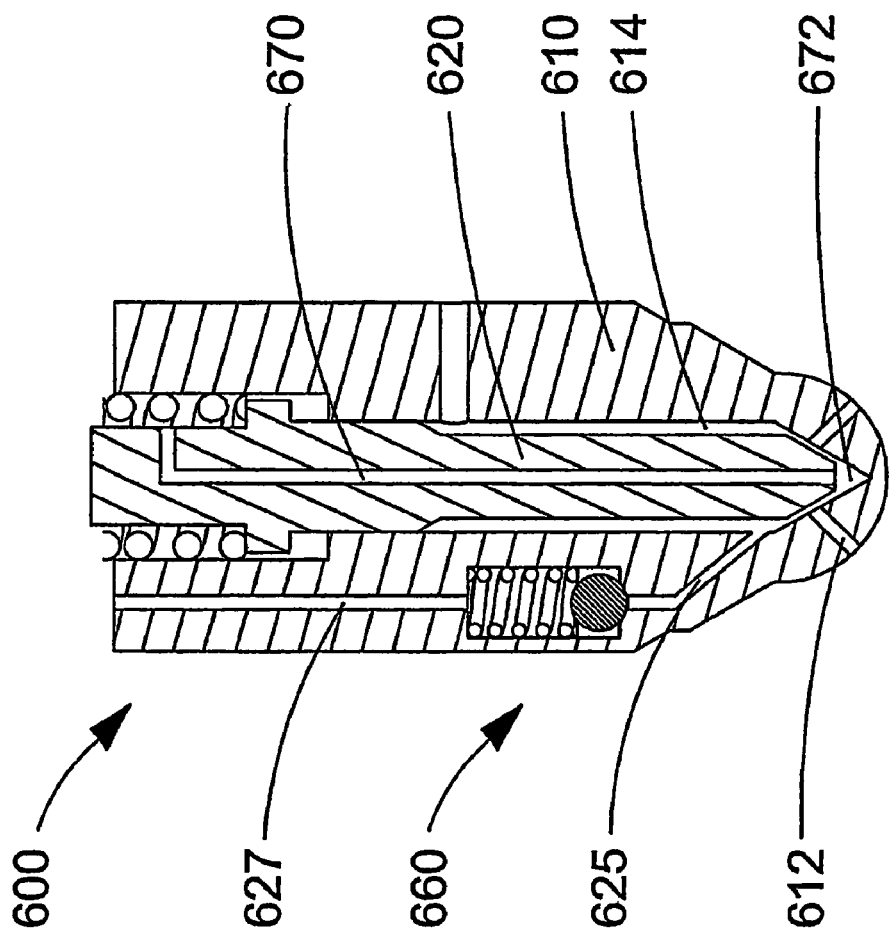
FIG. 6 illustrates a partial section view of an embodiment of the liquid cooled fuel injection valve, which combines the feature of a drain passage and drain valve assembly, with a spill port for shaping that rate of fuel injection into a combustion chamber.

With reference to FIG. 6, in another embodiment, in addition to drain passage 625, drain port 627, and drain valve assembly 660, liquid cooled fuel injection valve 600 further comprises spill port 670, which is isolated from fuel cavity 614 when valve member 620 is seated against a sealing surface of injection valve body 610. Spill port 670 may be employed to shape the rate of fuel injection during an injection event as described in U.S. Pat. No. 5,765,755. Spill port 670 extends between sac volume 672 and drain passages within fuel injection valve 600. In the illustrated arrangement, spill port 670 allows additional fuel flow into the drain system during an injection event.

Valve member 620 may cooperate with a second seat between sac volume 672 and nozzle orifice 612 to prevent compressed air and combustion products from entering the drain system when the fuel injection valve is closed.

As will be apparent to those skilled in the art in the light of the foregoing disclosure, many alterations and modifications are possible in the practice of this invention without departing form the spirit or scope thereof. Accordingly, the scope of the invention is to be construed in accordance with the substance defined by the following claims.

What is claimed is:

1. A fuel injection valve comprising:
   (a) an injection valve body that comprises a longitudinal axis with an injector tip comprising at least one nozzle orifice associated with one end of said longitudinal axis, wherein said injector tip is installable at a location in an engine where a liquid fuel can be injected directly into a combustion chamber through said at least one nozzle orifice;

(b) a fuel cavity disposed within said injection valve body near said injector tip;

(c) a valve member disposed within said injection valve body, wherein said valve member is movable parallel to said longitudinal axis between a closed position where said valve member contacts a valve seat, and an open position where said valve member is spaced apart from said valve seat, whereby said liquid fuel may flow from said fuel cavity, between said valve member and said valve seat, and into said combustion chamber through said at least one nozzle orifice;

(d) a fuel supply passage disposed within said injection valve body and communicating between a fuel inlet port and said fuel cavity;

(e) a drain passage communicating between said fuel cavity and a drain system for returning said liquid fuel to a fuel supply system; and (f) a drain valve associated with said drain passage and disposed within said injection valve body, wherein said drain valve is closeable to stop fuel from flowing through said drain passage, wherein said drain valve is operable independently from actuation of said valve member, and wherein said drain valve is spring biased so that it does not open unless fuel pressure within said fuel cavity is greater than a predetermined set point.

2. The fuel injection valve of claim 1 wherein said drain passage comprises a bore within said valve member and a port opening between said fuel cavity and said bore.

3. The fuel injection valve of claim 2 wherein said bore is a blind bore closed at the end of said valve member that cooperates with said valve seat within said injector tip.

4. The fuel injection valve of claim 2 wherein said drain valve is disposed in a chamber within said valve member and said drain valve comprises a spring biased element that is movable from a seated position to allow said liquid fuel to flow through said bore when fuel pressure within said fuel cavity is greater than said predetermined set point.

5. The fuel injection valve of claim 2 wherein said drain valve comprises a spring clip comprising one end attached to said valve member and a free end covering a drain orifice through which said liquid fuel may exit said bore and flow into said drain system by lifting the free end away from said drain orifice when fuel pressure within said fuel cavity is greater than said predetermined set point.

6. The fuel injection valve of claim 2 wherein said drain valve comprises a shuffle member that is movable within a chamber disposed within said valve member, wherein said shuffle member is movable against the bias of a drain valve spring to open a drain port when the pressure of said liquid fuel within said bore is greater than said predetermined set point.

7. The fuel injection valve of claim 1 wherein said drain passage comprises a bore within said injection valve body and a port opening between said fuel cavity end said bore.

8. The fuel injection valve of claim 7 wherein said drain valve is disposed in a chamber within said injection valve body and said drain valve comprises a spring biased element that is movable from a seated position to allow said liquid fuel to flow through said bore when fuel pressure within said fuel cavity is greater than said predetermined set point.

9. The fuel injection valve of claim 7 wherein said drain valve comprises a spring member comprising one end attached to said injection valve body and a free end covering a drain orifice through which said liquid fuel may exit said bore and flow into said drain system by lifting the free end away from said drain orifice when fuel pressure within said fuel cavity is greater than said predetermined set point.

10. The fuel injection valve of claim 7 wherein said drain valve comprises a shuffle member that is movable within a chamber disposed within said injection valve body, wherein said shuffle member is movable against the bias of a drain valve spring to open a drain port when the pressure of said liquid fuel within said bore is greater than said predetermined set point.

11. The fuel injection valve of claim 1 wherein said drain valve is a one-way valve through which fuel may only flow through said drain passage from said fuel cavity and into said drain system.

12. The fuel injection valve of claim 1 wherein said drain valve is openable by increasing amounts up to a predetermined maximum open position to allow more fuel to flow through said drain passage as pressure of said liquid fuel increases within said fuel cavity.

13. The fuel injection valve of claim 1 wherein said drain valve is calibrated to open after engine start-up conditions are completed.

14. A injection valve comprising:

(a) an injection valve body that comprises a longitudinal axis with an injector tip comprising at least one nozzle orifice associated with one end of said longitudinal axis, wherein said injector tip is installable at a location in an engine where a liquid fuel can be injected directly into a combustion chamber through said at least one nozzle orifice;

(b) a fuel cavity disposed within said injection valve body near said injector tip;

(c) a valve member disposed within said injection valve body, wherein said valve member is movable parallel to said longitudinal axis between a closed position where said valve member contacts a valve seat, and an open position where said valve member is spaced apart from said valve seat, whereby said liquid fuel may flow from said fuel cavity, between said valve member and said valve seat, and into said combustion chamber through said at least one nozzle orifice;

(d) a fuel supply passage disposed within said injection valve body and communicating between a fuel inlet sort and said fuel cavity;

(e) a drain passage communicating between said fuel cavity and a drain system for returning said liquid fuel to a fuel supply system;

(f) a drain valve associated with said drain passage and disposed within said injection valve body, wherein said drain valve is closeable to stop fuel from flowing through said drain passage and wherein said drain valve is operable independently from actuation of said valve member; and (g) wherein said fuel injection valve is a component of a combined fuel injection valve for independently and separately injecting gaseous fuel and liquid fuel into said combustion chamber.

15. The fuel injection valve of claim 14 wherein said injection valve body is movable within a body of said combined fuel injection valve, whereby said injection valve body serves as a movable needle for an outer fuel injection valve.

16. A fuel injection valve comprising:

(a) an injection valve body that comprises a longitudinal axis with an injector tip comprising at least one nozzle orifice associated with one end of said longitudinal axis, wherein said injector tip is installable at a location in an engine where a liquid fuel can be injected directly into a combustion chamber through said at least one nozzle orifice;

(b) a fuel cavity disposed within said injection valve body near said injector tip;

(c) a valve member disposed within said injection valve body, wherein said valve member is movable parallel to said longitudinal axis between a closed position where said valve member contacts a valve seat, and an open position where said valve member is spaced apart from said valve seat, whereby said liquid fuel may flow from said fuel cavity, between said valve member and said valve seat, and into said combustion chamber through said at least one nozzle orifice;

(d) a fuel supply passage disposed within said injection valve body and communicating between a fuel inlet port and said fuel cavity;

(e) a drain passage communicating between said fuel cavity and a drain system for returning said liquid fuel to a fuel supply system; and (f) a drain valve associated with said drain passage and disposed within said injection valve body, wherein said drain valve is closeable to stop fuel from flowing through said drain passage and wherein said drain valve is operable independently from actuation of said valve member; and (g) wherein said fuel injection valve is a component of a combined fuel injection valve for independently and separately injecting liquid fuel into said combustion chamber through two different sets of nozzle orifices.

17. The fuel injection valve of claim 16 wherein said injection valve body is movable within a body of said combined fuel injection valve, whereby said injection valve body serves as a movable needle for an outer fuel injection valve.

18. A fuel injection valve comprising:

(a) en injection valve body that comprises a longitudinal axis with an injector tip comprising at least one nozzle orifice associated with one end of said longitudinal axis, wherein said injector tip is installable at a location in an engine where a liquid fuel can be injected directly into a combustion chamber through said at least one nozzle orifice;

(b) a fuel cavity disposed within said injection valve body near said injector tip;

(c) a valve member disposed within said injection valve body, wherein said valve member is movable parallel to said longitudinal axis between a closed position where said valve member contacts a valve seat, and an open position where said valve member is spaced apart from said valve seat, whereby said liquid fuel may flow from said fuel cavity, between said valve member and said valve seat, and into said combustion chamber through said at least one nozzle orifice;

(d) a fuel supply passage disposed within said injection valve body and communicating between a fuel inlet port and said fuel cavity;

(e) a drain passage communicating between said fuel cavity and a drain system for returning said liquid fuel to a fuel supply system; and (f) a drain valve associated with said drain passage and disposed within said injection valve body, wherein said drain valve is closeable to stop fuel from flowing through said drain passage and wherein said drain valve is operable independently from actuation of said valve member; and (g) an actuator for said valve member and wherein said liquid fuel is delivered to said fuel supply passage from a common rail fuel supply system at injection pressure.

19. The fuel injection valve of claim 1 wherein said predetermined set point is between two different fuel pressures in an operating band of said fuel supply system.

20. The fuel injection valve of claim 19 wherein said operating band of said fuel supply system is between 15 MPa and 30 MPa.

21. The fuel injection valve of claim 1 wherein fuel pressure within said fuel cavity is controllable between a first pressure that is lower than said predetermined set point and a second pressure that is higher than said predetermined set point, and operation of said fuel injection valve is controllable to adjust for changes in pressure within said fuel cavity between said first and second pressures so that the desired amount of fuel is injected into said combustion chamber.

22. The fuel injection valve of claim 1 wherein fuel pressure within said fuel cavity is controllable between a first pressure that is lower than said predetermined set point and a second pressure that is higher than said predetermined set point, so that during engine operation under a first set of predetermined operating conditions, pressure within said fuel cavity is maintained between said first pressure and said predetermined set point to prevent flow through said drain valve, and under a second set of predetermined operating conditions, pressure within said fuel cavity is maintained between said predetermined set point and said second pressure to enable flow through said drain valve.

23. The fuel injection valve of claim 22 wherein fuel pressure within said fuel cavity is controllable between said predetermined set point and said second pressure to control the amount of fuel flowing through said drain valve, whereby higher pressures within said fuel cavity cause higher mass flow rates through said drain valve.

24. A fuel injection valve comprising:

(a) an injection valve body that comprises a longitudinal axis with an injector tip comprising at least one nozzle orifice associated with one end of said longitudinal axis, wherein said injector tip is installable at a location in an engine where a liquid fuel can be injected directly into a combustion chamber through said at least one nozzle orifice;

(b) a fuel cavity disposed within said infection valve body near said injector tip;

(c) a valve member disposed within said injection valve body, wherein said valve member is movable parallel to said longitudinal axis between a closed position where said valve member contacts a valve seat, and an open position where said valve member is spaced apart from said valve seat, whereby said liquid fuel may flow from said fuel cavity, between said valve member and said valve seat, and into said combustion chamber through said at least one nozzle orifice;

(d) a fuel supply passage disposed within said injection valve body and communicating between a fuel inlet port and said fuel cavity;

(e) a drain passage communicating between said fuel cavity and a drain system for returning said liquid fuel to a fuel supply system; and (f) a drain valve associated with said drain passage and disposed within said injection valve body, wherein said drain valve is closeable to store fuel from flowing through said drain passage, wherein said drain valve is operable independently from actuation of said valve member, and (g) a spill port associated with said valve member communicating between said drain system and a space in communication with said fuel cavity when said valve member is in said open position.

25. The fuel injection valve of claim 24 wherein said space is a sac volume of said fuel injection valve, which further comprises a second valve seat disposed between said sac volume and said at least one nozzle orifice.

26. A fuel injection valve comprising:
(a) an injection valve body that comprises a longitudinal axis with an injector tip comprising a nozzle orifice associated with one end of said longitudinal axis, wherein said injector tip is installable at a location in an engine where a liquid fuel can be injected directly into a combustion chamber through said nozzle orifice;
(b) a fuel cavity disposed within said injection valve body near said injector tip;
(c) a valve member disposed within said injection valve body, wherein said valve member is movable parallel to said longitudinal axis between a closed position wherein said valve member contacts a valve seat, and an open position wherein said valve member is spaced apart from said valve seat, whereby fuel may flow out from said fuel cavity, between said valve member and said valve seat, and into said combustion chamber through said nozzle orifice;
(d) a fuel supply passage disposed within said injection valve body and communicating between a fuel inlet port and said fuel cavity;
(e) a drain passage communicating between said fuel cavity and a drain system for returning fuel to a fuel supply system; and
(f) a drain valve associated with said drain passage, wherein said drain valve is biased to close and stop fuel from flowing through said drain passage when fuel pressure within said fuel cavity is less than a predetermined set point and fuel flows through said drain valve to said drain passage when fuel pressure within said fuel cavity is greater than said predetermined set point, independently from actuation of said valve member.

27. The fuel injection valve of claim 26 wherein said drain valve is disposed within said injection valve body.

28. The fuel injection valve of claim 27 wherein said drain valve comprises a spring biased element.

29. The fuel injection valve of claim 26 wherein said drain passage is disposed within said valve member and said drain valve is associated with said valve member.

30. The fuel injection valve of claim 29 wherein said drain valve comprises a spring biased element.

31. The fuel injection valve of claim 26 wherein said drain valve is calibrated to open after engine start-up conditions are completed.

32. A method of cooling an injector tip of a fuel injection valve that is exposed to the temperatures within a combustion chamber, said method comprising;
supplying a liquid fuel to a fuel cavity disposed within said injector tip;
draining a first portion of said liquid fuel from said fuel cavity and out of said fuel injection valve independently from actuation of said fuel injection valve to inject fuel into said combustion chamber;
stopping said first portion of said liquid fuel from draining from said fuel cavity when pressure within said fuel cavity is less than a predetermined set point; and
during engine operation, injecting a second portion of said liquid fuel from said fuel cavity into said combustion chamber.

33. The method of claim 32 further comprising controlling fuel pressure within said fuel cavity during engine operation, wherein said fuel pressure is controlled to be between a first pressure that is lower than said predetermined set point and a second pressure that is higher than said predetermined set point.

34. The method of claim 33 wherein the mass flowrate of said first portion of said liquid fuel is increasable by increasing pressure within said fuel cavity, when fuel pressure within said fuel cavity is greater than said predetermined set point.

35. The method of claim 33 further comprising keeping fuel pressure within said fuel cavity between said first pressure and said predetermined set point during engine start up.

36. The method of claim 33 further comprising keeping fuel pressure within said fuel cavity between said first pressure and said predetermined set point during engine shut down.

37. The method of claim 33 further comprising keeping fuel pressure within said fuel cavity between said first pressure and said predetermined set point when said engine is idling.

38. The method of claim 33 further comprising keeping fuel pressure within said fuel cavity between said first pressure and said predetermined set point when engine load is less than a predetermined load.

39. The method of claim 33 further comprising keeping fuel pressure within said fuel cavity between said predetermined set point and said second pressure when engine load is greater than a predetermined load.

40. The method of claim 32 wherein said predetermined set point is calibrated so that said first portion of said liquid fuel is stopped from draining during start up conditions.

41. The method of claim 32 wherein said first portion of said liquid fuel is automatically continuously drained when pressure within said fuel cavity is greater than said predetermined set point.

42. The method of claim 32 further comprising supplying said liquid fuel to said fuel injection valve from a high pressure common rail fuel supply system.

43. The method of claim 42 further comprising controlling a fuel pump to control pressure within said common rail supply system in response to predetermined cooling requirements for said fuel injection valve based upon an engine operating condition.

44. The method of claim 42 further comprising actuating a pressure regulating valve to control pressure within said common rail supply system in response to predetermined cooling requirements for said fuel injection valve based upon an engine operating condition.

45. The method of claim 32 further comprising draining a third portion of said liquid fuel from said fuel injection valve during an injection event.

46. A method of manufacturing a fuel injection valve comprising an injection valve body with an injector tip comprising at least one nozzle orifice, a fuel cavity disposed within said injection valve body near said injector tip, a valve member disposed within said injection valve body, wherein said valve member is movable between a closed position where said valve member contacts a valve seat, and an open position where said valve member is spaced apart from said valve seat so that said liquid fuel may flow from said fuel cavity, between said valve member and said valve seat, and into a combustion chamber through said at least one nozzle orifice, a fuel supply passage disposed within said injection valve body and communicating between a fuel inlet port and said fuel cavity; a drain passage communicating between said fuel cavity and a drain system for returning a portion of said liquid fuel to a fuel supply system wherein said drain passage comprises a bore provided within said valve member, and a drain valve associated with said drain passage and disposed within said injection valve body, wherein said drain valve is closeable to stop fuel from flowing through said drain passage and wherein said drain valve is operable independently from actuation of said valve member, said method comprising making said bore using electro-discharge machining.

* * * * *